Patented Apr. 17, 1951

2,549,586

UNITED STATES PATENT OFFICE 2,549,586

SEPARATION OF HYDROCARBONS WITH KETO ESTERS

Theodore W. Evans, Oakland, and Rupert C. Morris, Berkeley, Calif., assignors to Shell Development Company, San Francisco, Calif., a corporation of Delaware No Drawing. Application November 17, 1945, Serial No. 629,320

4 Claims. (Cl. 183—115)

This invention relates to the separation of hydrocarbons and more particularly pertains to a practical and economical method for effecting the separation of hydrocarbon mixtures of narrow boiling range containing two or more hydrocarbons of different degrees of saturation, which are difficult to separate by ordinary fractional distillation.

In the treatment, for example, of cracked petroleum distillates it is relatively easy by ordinary fractional distillation to obtain fractions which predominate in hydrocarbons of both saturated and unsaturated character containing the same number of carbon atoms. However, separation of these fractions into their components by simple distillation, while theoretically possible, presents almost insurmountable practical difficulties. This is due, of course, to the very slight difference existing between the boiling points of the components of such mixtures.

Various methods have been proposed for effecting the separation or purification of hydrocarbon mixtures containing components of different degrees of saturation which are difficult to separate by ordinary fractionation. Of these methods the most practical from the standpoint of large-scale operation are those which involve contacting the mixture with a solvent, which has a preferential solubility for one or more of the components thereof. Such processes may be carried out in various ways, the most common mode comprising the use of a spray, packed, or bubble plate tower, wherein the mixture is scrubbed by a stream of selective solvent flowing therethrough, usually in countercurrent relation to the mixture under treatment. Improved results are attained in many cases by distilling the mixture in the presence of the solvent. This method is commonly referred to as extractive distillation. While susceptible to some variation, processes of this latter type are, in general, executed by causing the solvent to flow down the distillation column, as the distillation proceeds and as vapors ascend from the kettle at the bottom of the column. Thus the solvent scrubs the vapors in a first zone, selectively dissolving the more soluble component and the resulting fat solvent is partially stripped in a second zone by vapor fresh from the distillation kettle, having a higher temperature than the vapor in the first zone. The dissolved component may be removed from the fat solvent by distillation, reduction of pressure, or by any other suitable means to produce a lean solvent which may be recirculated.

Extractive distillation processes are often executed in a continuous manner, the mixture to be separated being continuously introduced into the column at a point below the solvent feed. Frequently, in continuous operation, it is the practice in lieu of heating the solution of the extracted component at the base of the column to supply the vapor to partially strip the descending fat solvent, to divert a portion of the overhead vapor produced during regeneration of the solvent to the base of the distillation column. Under this method of operation it is not essential that the distillation column be provided with a heat source. A "top reflux" is also usually provided, part of the overhead product of the distillation column being condensed and returned thereto at a point above the solvent feed. Intervening plates between the top reflux and solvent inlet ports are advisable when operating with a top reflux.

An object of the present invention is to provide solvents adapted for use in the extraction processes of the hereinabove described type, which solvents have a greater selectivity for dienes as contained in mixtures with mono-olefins than solvents previously disclosed and which may be applied also to the separation of dienes and/or mono-olefins from paraffins.

A class of solvents which has been found to answer to the above objects, consists of the keto-esters, namely the esters of keto alcohols and the esters of keto acids. Among the many compounds of this type suitable for use in the execution of the invention may be mentioned: esters of keto alcohols, as the formates, acetates, etc. of hydroxy acetone, dimethyl ketol, diacetone alcohol, and the like; esters of keto acids such as, methyl aceto-acetate, ethyl aceto-acetate, methyl levulinate, ethyl levulinate, isopropyl pyruvate, etc.; and esters of keto alcohols with keto acids, for instance the pyruvic acid ester of hydroxy acetone, dimethyl ketol aceto-acetate and analogous esters. While saturated aliphatic keto esters such as the foregoing are the preferred solvents because of their exceptional selectivity and stability, the invention is not limited thereto since, at some sacrifice in these characteristics, unsaturated and/or aromatic keto esters, such, for example, as ethyl benzoyl-acetate, etc. As a rule keto-esters having 4 to about 14, most preferably 4 to 10, carbon atoms per molecule are preferred since the selectivity of the solvent generally decreases with increasing molecular weight. It is desirable to use keto esters which are liquid at the operating temperature, and preferably keto esters melting below about 150° C. are used. Most advantageously normally liquid keto esters are employed to avoid any difficulty from plugging of pipe lines by solidification of the solvent. It is also advantageous to use keto esters which boil below about 400° C., and most preferably below about 200° C.

While the foregoing solvents are of general application, it is to be understood that they may not be equally efficacious in a given separation problem. It is preferred to operate with a solvent in which the volatility ratio of the components of the mixture to be separated is most favorable to their separation. Relative volatility is defined for a simple two component system in the presence of a higher boiling selective solvent as follows:

$$\alpha = \frac{P_1}{X_1} \Big/ \frac{P_2}{X_2}$$

wherein $\alpha$ = relative volatility
$P_1$ = partial pressure of first component
$P_2$ = partial pressure of second component
$X_1$ = mol fraction of the first component in the total liquid including the selective solvent
$X_2$ = mol fraction of the second component in the total liquid including the selective solvent As a rule, we prefer to operate with a keto ester which gives an alpha ($\alpha$) value for the mixture being separated which is at least 1.15 and more preferably about 1.5 or higher.

The solubility ratio in the proposed solvent of the components to be separated is also a good indication of the efficacy of the solvent. This is easily determined by bubbling a measured quantity of each hydrocarbon present in the mixture to be separated through the proposed solvent and analyzing the unabsorbed vapors.

The mixture to be separated may be introduced into contact with the solvent either as a vapor or as a liquid. The amount of ratio of solvent should be at least sufficient to dissolve a major portion of the constituent to be extracted. In some cases a considerable excess over this amount may be used, especially where it is desired to remove the last traces of the more soluble constituent of the mixture. The most economical amount varies with the nature of the solvent involved, the temperatures and pressures employed, and the particular mixture to be extracted.

When the hydrocarbon mixture is not distilled in the presence of the solvent but is merely passed into contact therewith, which procedure may be referred to as ordinary extraction in order to distinguish from extractive distillation, the most suitable operating temperature varies with the pressure maintained during the extraction and is usually a compromise. This follows from the fact that both solubility and selectivity are necessary. At low temperatures, for a fixed pressure, the solubility may be so great as to allow for no selectivity, while at high temperatures (approaching the boiling point of the solvent at the existing pressure) so little material can dissolve that the operation again is not an economical one no matter how high the selectivity may become. Usually it is preferred to operate at a temperature substantially below the boiling point of the solvent but slightly above the condensation temperature of the most readily condensible constituent of the mixture at the existing pressure, the mixture being introduced into contact with the solvent as a vapor.

When the hydrocarbon mixture is distilled in the presence of the solvent, it is in general preferred to operate at a superatmospheric pressure, particularly when the mixture is made up of normally gaseous components, because this does away with the necessity of refrigerating the still head as with ammonia or sulfur dioxide. However, in certain cases as where the spread between the effective distillation temperatures of the components to be separated in the presence of the solvent is greatest at subatmospheric pressures, it may be advantageous to operate at a reduced pressure despite the additional expense occasioned by the use of a refrigerant. In an extractive distillation as in ordinary distillation the reflux rate or rates depends upon various factors including the degree of separation required, the size and number of plates in the available column, etc. Plate requirements to achieve a given throughput may be conveniently estimated according to the graphical method of McCabe and Thiele.

The present process is especially valuable in the separation of narrow boiling mixtures predominating in hydrocarbons of four carbon atoms, but is also applicable with good results to the separation of ethylene from ethane, propylene from propane, pentadienes from amylenes, pentadienes and/or amylenes from iso and/or n-pentane, etc.

The accompanying table, which gives the solubilities of butadiene and butylene at 20° C. and at one atmosphere pressure in several of the solvents listed above, is submitted in illustration of the suitability of the solvents of the invention in the separation of hydrocarbons of four carbon atoms having different degrees of saturation. Presentation of this table is not to be considered as limiting the invention to the particular solvents covered thereby.

TABLE I

| Compound | cc.'s Gas Dissolved in 10 cc. Solvent at 20 deg. C. and Atmospheric Pressure | | Solubility Ratio | Formula | B. P. solvent, deg. C. |
|---|---|---|---|---|---|
| | Butadiene | Butylene | | | |
| Methyl Acetoacetate | 707 | 402 | 1.75 | $CH_3-\overset{O}{\underset{\|}{C}}-CH_2-\overset{O}{\underset{\|}{C}}-OCH_3$ | 170. |
| Ethyl Acetoacetate | 713 | 438 | 1.63 | $CH_3-\overset{O}{\underset{\|}{C}}-CH_2-\overset{O}{\underset{\|}{C}}-OC_2H_5$ | 180. |
| Methyl Levulinate | 637 | 434 | 1.46 | $CH_3-\overset{O}{\underset{\|}{C}}-CH_2-CH_2-\overset{O}{\underset{\|}{C}}-OCH_3$ | 85 (14 mm.). |

The following results show some of the advantages of the invention in certain of its applications:

TABLE II

*Minimum reflux ratio and plate requirements for the separation of butadiene and butylene by extractive distillation*

| Solvent | Minimum[1] Reflux Ratio | Minimum[1] Theoretical Plates | $\alpha$ Value[2] |
|---|---|---|---|
| Methyl Acetoacetate | 3.2 | 8.5 | 1.60 |
| Methyl Levulinate | 5.1 | 12.5 | 1.37 |
| Diacetone Alcohol Acetate | 7.9 | 18 | 1.24 |

[1] These values were calculated for a feed containing 50% butadiene+50% butylene and the column producing a 98% pure product.
[2] Determined at 60° C. using a solvent to feed ratio of 85-15, the feed containing 48.9% butadiene, 51.1% $\alpha$ and $\beta$ butylene.

Similar good results may be obtained when keto esters are used in the separation of pentadiene, for example, from more saturated hydrocarbons which also have five carbon atoms per molecule and in such application they have the further advantage of requiring fewer distillation columns than are necessary when the extractive distillation is carried out with a solvent such as acetone which forms an azeotrope with $C_5$ hydrocarbons making it necessary to employ additional columns to remove the solvent from the recovered pentadiene.

The present application is a continuation-in-part of copending application, Serial Number 462,623 filed October 19, 1942, now U. S. Patent 2,389,144.

We claim as our invention:

1. A process for the separation of butadiene from butylenes which comprises contacting a gaseous mixture of butadiene and a butylene with liquid methyl acetoacetate to selectively dissolve the butadiene, separating the residual gas from the liquid solution containing butadiene, and heating said solution to recover butadiene therefrom.

2. A process for the separation of butadiene from butylenes which comprises contacting a mixture of butadiene and a butylene with liquid methyl acetoacetate to selectively dissolve butadiene, separating the residual undissolved hydrocarbon from the liquid solution containing butadiene, and recovering butadiene from the solution.

3. A process for the separation of a diolefin from a hydrocarbon mixture containing said diolefin and a mono-olefin having the same number of carbon atoms per molecule as said diolefin which comprises contacting said mixture with liquid methyl acetoacetate to selectively dissolve said diolefin, separating the residual undissolved hydrocarbon from the liquid solution containing the dissolved diolefin, and recovering the diolefin from said last-mentioned liquid solution.

4. A process for the separation of an olefinic hydrocarbon from a hydrocarbon mixture containing it and a more saturated hydrocarbon having the same number of carbon atoms per molecule as said olefinic hydrocarbon, which comprises contacting said mixture with liquid methyl acetoacetate to selectively dissolve said olefinic hydrocarbon, and separating the undissolved portion of the mixture from the liquid solution containing the dissolved olefinic hydrocarbon.

THEODORE W. EVANS.
RUPERT C. MORRIS.

REFERENCES CITED

The following references are of record in the file of this patent:

UNITED STATES PATENTS

| Number | Name | Date |
|---|---|---|
| 1,882,978 | Schmidt et al. | Oct. 18, 1932 |
| 1,938,083 | Mueller-Cunradi | Dec. 5, 1933 |
| 1,996,088 | Taylor | Apr. 2, 1935 |
| 2,153,115 | Burk | Apr. 4, 1939 |
| 2,392,277 | Welling | Jan. 1, 1946 |